US012513475B2

(12) United States Patent
Braband et al.

(10) Patent No.: US 12,513,475 B2
(45) Date of Patent: Dec. 30, 2025

(54) CABLE CONNECTOR FOR HEARING DEVICE

(71) Applicant: STARKEY LABORATORIES, INC., Eden Prairie, MN (US)

(72) Inventors: Josh Braband, Eden Prairie, MN (US); Daniel Smieja, Minneapolis, MN (US); Tom Monsen, Chaska, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 235 days.

(21) Appl. No.: 18/226,598

(22) Filed: Jul. 26, 2023

(65) Prior Publication Data

US 2024/0040324 A1 Feb. 1, 2024

Related U.S. Application Data

(60) Provisional application No. 63/393,104, filed on Jul. 28, 2022.

(51) Int. Cl.
*H04R 25/00* (2006.01)

(52) U.S. Cl.
CPC ......... *H04R 25/604* (2013.01); *H04R 25/654* (2013.01); *H04R 2225/0216* (2019.05); *H04R 2225/57* (2019.05)

(58) Field of Classification Search
CPC ................ H04R 25/604; H04R 25/654; H04R 2225/0216; H04R 2225/57; H04R 25/60; H04R 25/609; H04R 25/65; H04R 2225/021
See application file for complete search history.

(56) References Cited

U.S. PATENT DOCUMENTS

| | | | | |
|---|---|---|---|---|
| 7,832,080 B2 | 11/2010 | Killion | | |
| 8,259,977 B2 | 9/2012 | Jorgensen | | |
| 2002/0085728 A1* | 7/2002 | Shennib | H04R 25/602 | 381/328 |
| 2014/0294214 A1* | 10/2014 | Zhao | H04R 25/60 | 381/330 |
| 2020/0128340 A1* | 4/2020 | Jeong | H04R 25/654 | |
| 2020/0366997 A1 | 11/2020 | Higgins | | |
| 2020/0389741 A1* | 12/2020 | Agac | H04R 25/556 | |

FOREIGN PATENT DOCUMENTS

WO WO-2021102469 A1 * 5/2021 ............. H04R 25/48

* cited by examiner

*Primary Examiner* — Mark Fischer
(74) *Attorney, Agent, or Firm* — Mueting Raasch Group

(57) ABSTRACT

Various embodiments of a connector and a hearing device cable that includes such connector are disclosed. The connector includes a body having a first end and a second end, where the first end is configured to be connected to a socket of a hearing module and the second end is configured to be connected to a cable; an acoustic path disposed through the body, where the acoustic path includes an outlet disposed in the first end of the body and an inlet disposed in the second end of the body; and an ingress filter disposed over the inlet of the acoustic path or at least partially within the acoustic path.

20 Claims, 8 Drawing Sheets

CABLE CONNECTOR FOR HEARING DEVICE

CROSS-REFERENCE TO RELATED APPLICATIONS

This application claims the benefit of U.S. Provisional Application No. 63/393,104, filed Jul. 28, 2022, the disclosure of which is incorporated by reference herein in its entirety.

BACKGROUND

Hearing devices such as hearing assistance devices (e.g., hearing aids, personal sound amplification products, assistive listening devices, etc.) can include a hearing module that is configured to be disposed between an ear and skull of a wearer and that is connected to an earpiece that is configured to be disposed within an ear canal of the ear. The hearing module and earpiece can be electrically and/or acoustically coupled utilizing a cable. The hearing module can include one or more microphones disposing within a module housing and that are acoustically coupled to the wearer's environment by one or more acoustic paths that extend from an exterior surface of the housing to the microphones. Performance of such microphones can, however, be reduced by foreign material or debris that can collect within these acoustic ports. Oftentimes, one or more ingress filters can be disposed over or within these acoustic paths to prevent such paths from being at least partially occluded by foreign material.

SUMMARY

In general, the present disclosure provides various embodiments of a connector for a cable and a hearing device that includes such cable. The connector can include an acoustic path disposed through a body of the connector, where the acoustic path includes an outlet disposed in a first end of the body and an inlet disposed in a second end of the body. The first end of the body of the connector can be configured to be connected to a cable socket of a hearing module of the hearing device, and the second end can be configured to be connected to the cable. The acoustic path of the connector can be configured to be acoustically coupled to a microphone that is disposed within a module housing of the hearing module when the connector is connected to the cable socket.

In one aspect, the present disclosure provides a connector that includes a body having a first end and a second end, where the first end is configured to be connected to a socket of a hearing module and the second end is configured to be connected to a cable; an acoustic path disposed through the body, where the acoustic path includes an outlet disposed in the first end of the body and an inlet disposed in the second end of the body; and an ingress filter disposed over the inlet of the acoustic path or at least partially within the acoustic path.

In another aspect, the present disclosure provides a hearing device cable that includes a cable body and a first connector disposed at a first end of the cable body. The first connector includes a body having a first end and a second end, where the body extends along a body axis between the first end and the second end, and where the first end is configured to be connected to a socket of a hearing module of a hearing device and the second end is connected to the first end of the cable body. The first connector further includes an acoustic path disposed through the body, where the acoustic path includes an outlet disposed in the first end of the body and an inlet disposed in the second end of the body; and an ingress filter disposed over the inlet of the acoustic path or at least partially within the acoustic path.

In another aspect, the present disclosure provides a hearing device that includes a hearing module having a cable socket and a microphone acoustically coupled to the cable socket, and a cable configured to be connected to the hearing module and including a cable body, a first connector disposed at a first end of the cable body, and a second connector disposed at a second end of the cable body. The first connector includes a body having a first end and a second end, where the first end is configured to be connected to the cable socket of the hearing module and the second end is connected to the first end of the cable body; an acoustic path disposed through the body and acoustically coupled to the microphone via the cable socket, where the acoustic path includes an outlet disposed in the first end of the body and an inlet disposed in the second end of the body; and an ingress filter disposed over the inlet of the acoustic path or at least partially within the acoustic path. The hearing device further includes an earpiece configured to be connected to the second connector of the cable.

In another aspect, the present disclosure provides a method that includes disposing an acoustic path through a body of a first connector of a cable; disposing an ingress filter over an inlet of the acoustic path or at least partially within the acoustic path; and connecting the first connector to a cable socket of a hearing module such that the acoustic path is acoustically coupled to a microphone disposed within the hearing module.

In another aspect, the present disclosure provides a connector that includes a body having a first end and a second end, where the first end is configured to be connected to a socket of a hearing module and the second end is configured to be connected to a cable; a microphone disposed at least partially within the body and including a microphone port; and an acoustic path including an inlet and an outlet, where the inlet is disposed in the second end of the body and the outlet is acoustically coupled to the microphone port. The connector further includes an ingress filter disposed over the inlet of the acoustic path or at least partially within the acoustic path.

In another aspect, the present disclosure provides a hearing device cable that includes a cable body and a first connector disposed at a first end of the cable body. The first connector includes a body having a first end and a second end, where the first end is configured to be connected to a socket of a hearing module and the second end is connected to the first end of the cable body; a microphone disposed at least partially within the body and including a microphone port; and an acoustic path having an inlet and an outlet, where the inlet is disposed in the second end of the body and the outlet is acoustically coupled to the microphone port. The first connector further includes an ingress filter disposed over the inlet of the acoustic path or at least partially within the acoustic path.

In another aspect, the present disclosure provides a hearing device that includes a hearing module having a cable socket and a microphone acoustically coupled to the cable socket; and a cable that includes a cable body, a first connector disposed at a first end of the cable body, and a second connector disposed at a second end of the cable body. The first connector includes a body having a first end and a second end, where the first end is configured to be connected to a socket of a hearing module and the second end is configured to be connected to a cable; a microphone disposed at least partially within the body and including a microphone port; an acoustic path having an inlet and an outlet, where the inlet is disposed in the second end of the body and the outlet is acoustically coupled to the microphone port; and an ingress filter disposed over the inlet of the acoustic path or at least partially within the acoustic path. The hearing device further includes an earpiece configured to be connected to the second connector of the cable.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
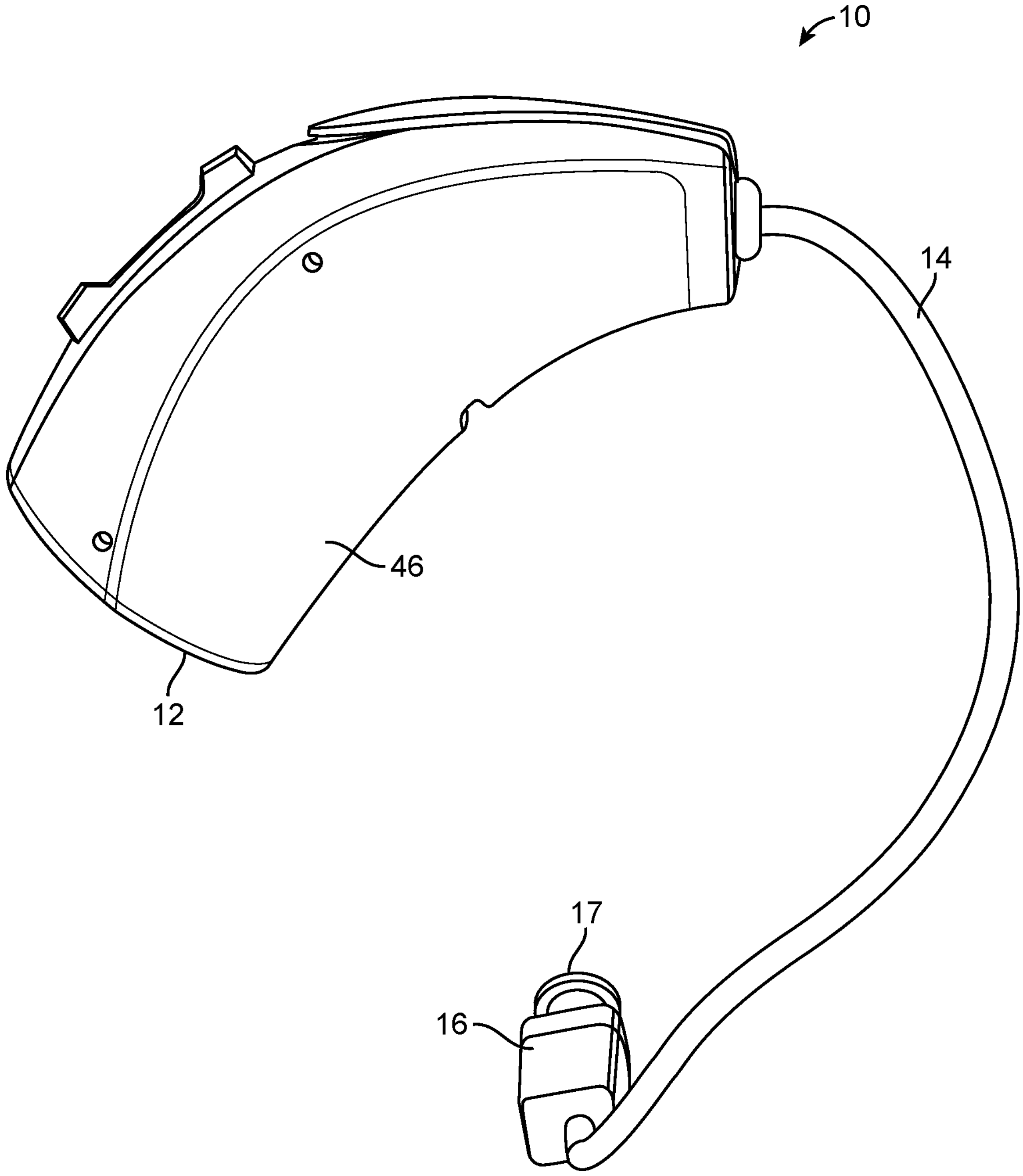
FIG. 1 is a schematic side view of one embodiment of a hearing device.

In general, the present disclosure provides various embodiments of a connector for a cable and a hearing device that includes such cable. The connector can include an acoustic path disposed through a body of the connector, where the acoustic path includes an outlet disposed in a first end of the body and an inlet disposed in a second end of the body. The first end of the body of the connector can be configured to be connected to a cable socket of a hearing module of the hearing device, and the second end can be configured to be connected to the cable. The acoustic path of the connector can be configured to be acoustically coupled to a microphone that is disposed within a module housing of the hearing module when the connector is connected to the cable socket.

Known hearing devices such as hearing assistance devices (e.g., hearing aids, personal sound amplification products, assistive listening devices, etc.) can include one or more microphones disposed in a housing of a hearing module that is disposed between an ear and skull of a wearer. Each microphone can be acoustically coupled to the ambient environment of the wearer by an acoustic path that extends from an outer surface of the housing of the hearing module and a microphone port of the microphone. Oftentimes these acoustic paths become at least partially occluded with debris. Such occlusion can limit the performance of the microphone.

One or more embodiments of connectors described herein can provide various advantages over known connectors. For example, simple replacement of the cable can provide an unobstructed acoustic path that is acoustically coupled to the microphone of the hearing module of the hearing device when the connector is connected to the cable socket of the hearing module. This acoustic path, which is disposed through the connector, may also produce a more consistent and desirable microphone response by being shorter than typical acoustic paths, easier to clean, and more consistently manufacturable than current designs. Furthermore, the placement of the acoustic path through the connector can allow for longer spacing between an inlet of a front microphone disposed adjacent to the cable socket and an inlet of a rear microphone disposed elsewhere on or within the hearing module, which can improve directional performance of the hearing device. In one or more embodiments, an ingress filter can be disposed over or at least partially within the acoustic path to prevent ingress of foreign material.

Embodiments of the disclosure are defined in the claims; however, herein there is provided a non-exhaustive listing of non-limiting examples. Any one or more of the features of these examples may be combined with any one or more features of another example, embodiment, or aspect described herein.

Example Ex1. A connector that includes a body having a first end and a second end, where the first end is configured to be connected to a socket of a hearing module and the second end is configured to be connected to a cable; an acoustic path disposed through the body, where the acoustic path includes an outlet disposed in the first end of the body and an inlet disposed in the second end of the body; and an ingress filter disposed over the inlet of the acoustic path or at least partially within the acoustic path.

Example Ex2. The connector of Ex1, where the ingress filter is disposed over the inlet of the acoustic path.

Example Ex3. The connector of Ex1, where the ingress filter is disposed within the acoustic path.

Example Ex4. The connector of any one of Ex1 to Ex3, where the acoustic path extends along a body axis between the first and second ends of the body.

Example Ex5. The connector of any one of Ex1 to Ex4, where at least a portion of the acoustic path extends along a curved path.

Example Ex6. The connector of any one of Ex1 to Ex5, further including a second acoustic path disposed through the body and including an outlet disposed in the first end of the body and an inlet disposed in the second end of the body.

Example Ex7. The connector of Ex6, further including a second ingress filter disposed over the inlet of the second acoustic path or at least partially within the second acoustic path.

Example Ex8. The connector of any one of Ex1 to Ex7, where the ingress filter is configured to prevent foreign material from at least partially occluding the acoustic path.

Example Ex9. A hearing device cable that includes a cable body and a first connector disposed at a first end of the cable body. The first connector includes a body having a first end and a second end, where the body extends along a body axis between the first end and the second end, and where the first end is configured to be connected to a socket of a hearing module of a hearing device and the second end is connected to the first end of the cable body. The first connector further includes an acoustic path disposed through the body, where the acoustic path includes an outlet disposed in the first end of the body and an inlet disposed in the second end of the body; and an ingress filter disposed over the inlet of the acoustic path or at least partially within the acoustic path.

Example Ex10. The cable of Ex9, further including a second connector disposed at a second end of the cable body, where the second connector is configured to be connected to an earpiece of a hearing device.

Example Ex11. The cable of any one of Ex9 to Ex10, where the ingress filter of the first connector is disposed over the inlet of the acoustic path.

Example Ex12. The cable of any one of Ex9 to Ex10, where the ingress filter of the first connector is disposed within the acoustic path.

Example Ex13. The cable of any one of Ex9 to Ex12, where the acoustic path of the first connector extends along the body axis between the first and second ends of the body of the first connector.

Example Ex14. The cable of any one of Ex9 to Ex13, where at least a portion of the acoustic path of the first connector extends along a curved path.

Example Ex15. The cable of any one of Ex9 to Ex14, further including a second acoustic path disposed through the body of the first connector and having an outlet disposed in the first end of the body and an inlet disposed in the second end of the body.

Example Ex16. The cable of Ex15, further including a second ingress filter disposed over the inlet of the second acoustic path of the first connector or at least partially within the second acoustic path.

Example Ex17. A hearing device that includes a hearing module having a cable socket and a microphone acoustically coupled to the cable socket, and a cable configured to be connected to the hearing module and including a cable body, a first connector disposed at a first end of the cable body, and a second connector disposed at a second end of the cable body. The first connector includes a body having a first end and a second end, where the first end is configured to be connected to the cable socket of the hearing module and the second end is connected to the first end of the cable body; an acoustic path disposed through the body and acoustically coupled to the microphone via the cable socket, where the acoustic path includes an outlet disposed in the first end of the body and an inlet disposed in the second end of the body;

and an ingress filter disposed over the inlet of the acoustic path or at least partially within the acoustic path. The hearing device further includes an earpiece configured to be connected to the second connector of the cable.

Example Ex18. The device of Ex17, where the microphone is disposed adjacent to the cable socket.

Example Ex19. The device of Ex18, where the cable socket includes an inlet and a wall including an outer surface that faces the inlet acoustic path and an inner surface that faces an interior of a module housing of the hearing module, where the microphone is disposed on the inner surface of the wall.

Example Ex20. The device of any one of Ex17 to Ex19, where a portion of the acoustic path is defined in a side wall of the cable socket such that the acoustic path is enclosed when the first connector is at least partially disposed in the socket.

Example Ex21. The device of any one of Ex17 to Ex20, where the acoustic path of the first connector is configured to receive acoustic energy from an ambient environment of the hearing module and direct the acoustic energy to the microphone disposed within the hearing module.

Example Ex22. The device of any one of Ex17 to Ex21, where the ingress filter of the first connector is disposed over the inlet of the acoustic path.

Example Ex23. The device of any one of Ex17 to Ex21, where the ingress filter of the first connector is disposed within the acoustic path.

Example Ex24. The device of any one of Ex17 to Ex23, where the acoustic path of the first connector extends along a body axis between the first and second ends of the body of the first connector.

Example Ex25. The device of any one of Ex17 to Ex24, where at least a portion of the acoustic path of the first connector extends along a curved path.

Example Ex26. The device of any one of Ex17 to Ex25, further including a second acoustic path disposed through the body of the first connector and including an outlet disposed in the first end of the body and an inlet disposed in the second end of the body.

Example Ex27. The device of Ex26, further including a second ingress filter disposed over the inlet of the second acoustic path of the first connector or at least partially within the acoustic path.

Example Ex28. The device of any one of Ex17 to Ex27, where the cable is configured to electrically connect the hearing module to the earpiece.

Example Ex29. The device of any one of Ex17 to Ex28, where the cable is configured to acoustically connect the hearing module to the earpiece.

Example Ex30. A method that includes disposing an acoustic path through a body of a first connector of a cable; disposing an ingress filter over an inlet of the acoustic path or at least partially within the acoustic path; and connecting the first connector to a cable socket of a hearing module such that the acoustic path is acoustically coupled to a microphone disposed within the hearing module.

Example Ex31. The method of Ex30, where disposing the ingress filter includes disposing the ingress filter over the inlet of the acoustic path.

Example Ex32. The method of Ex30, where disposing the ingress filter includes disposing the ingress filter within the acoustic path.

Example Ex33. The method of any one of Ex30 to Ex32, further including connecting a second connector of the cable to an earpiece.

Example Ex34. The method of any one of Ex30 to Ex33, further including electrically connecting the hearing module to an earpiece.

Example Ex35. The method of any one of Ex30 to Ex33, further including acoustically connecting the hearing module to an earpiece.

Example Ex36. A connector that includes a body having a first end and a second end, where the first end is configured to be connected to a socket of a hearing module and the second end is configured to be connected to a cable; a microphone disposed at least partially within the body and including a microphone port; and an acoustic path including an inlet and an outlet, where the inlet is disposed in the second end of the body and the outlet is acoustically coupled to the microphone port. The connector further includes an ingress filter disposed over the inlet of the acoustic path or at least partially within the acoustic path.

Example Ex37. The connector of Ex36, where the body further includes a protrusion extending from the second end of the body and configured to be disposed between the inlet of the acoustic path and an ear, finger, or other part of a wearer when engaging the body.

Example Ex38. The connector of any one of Ex36 to Ex37, further including a substrate disposed at least partially within the body of the connector and extending from the first end of the body, where the microphone is disposed on the substrate.

Example Ex39. The connector of Ex38, further including a conductive pad disposed on a portion of the substrate, where the conductive pad is configured to be electrically connected to the microphone and the cable.

Example Ex40. The connector of Ex39, where the conductive pad is further configured to electrically connect the microphone and cable to one or more electronic components disposed within a housing of the hearing module.

Example Ex41. The connector of any one of Ex38 to Ex40, where a portion of the acoustic path is formed by the substrate.

Example Ex42. The connector of Ex41, where the portion of the acoustic path that is formed by the substrate extends through the substrate.

Example Ex43. The connector of any one of Ex36 to Ex42, further including a second microphone disposed at least partially within the body.

Example Ex44. A hearing device cable that includes a cable body and a first connector disposed at a first end of the cable body. The first connector includes a body having a first end and a second end, where the first end is configured to be connected to a socket of a hearing module and the second end is connected to the first end of the cable body; a microphone disposed at least partially within the body and including a microphone port; and an acoustic path having an inlet and an outlet, where the inlet is disposed in the second end of the body and the outlet is acoustically coupled to the microphone port. The first connector further includes an ingress filter disposed over the inlet of the acoustic path or at least partially within the acoustic path.

Example Ex45. The cable of Ex44, further including a second connector disposed at a second end of the cable body, where the second connector is configured to be connected to an earpiece of a hearing device.

Example Ex46. The cable of any one of Ex44 to Ex45, where the body further includes a protrusion extending from the second end of the body and configured to be disposed between the inlet of the acoustic path and an ear, finger, or other part of a wearer when engaging the body.

Example Ex47. The cable of any one of Ex44 to Ex46, further including a substrate disposed at least partially within the connector and extending from the first end of the body, where the microphone is disposed on the substrate.

Example Ex48. The cable of Ex47, further including a conductive pad disposed on a portion of the substrate, where the conductive pad is configured to be electrically connected to the microphone and the cable.

Example Ex49. The cable of Ex48, where the conductive pad is further configured to electrically connect the microphone and cable to one or more electronic components disposed within a housing of the hearing module.

Example Ex50. The cable of any one of Ex47 to Ex49, where a portion of the acoustic path is formed by the substrate.

Example Ex51. The cable of Ex50, where the portion of the acoustic path that is formed by the substrate extends through the substrate.

Example Ex52. The cable of any one of Ex44 to Ex51, further including a second microphone disposed at least partially within the body.

Example Ex53. A hearing device that includes a hearing module having a cable socket and a microphone acoustically coupled to the cable socket; and a cable that includes a cable body, a first connector disposed at a first end of the cable body, and a second connector disposed at a second end of the cable body. The first connector includes a body having a first end and a second end, where the first end is configured to be connected to a socket of a hearing module and the second end is configured to be connected to a cable; a microphone disposed at least partially within the body and including a microphone port; an acoustic path having an inlet and an outlet, where the inlet is disposed in the second end of the body and the outlet is acoustically coupled to the microphone port; and an ingress filter disposed over the inlet of the acoustic path or at least partially within the acoustic path. The hearing device further includes an earpiece configured to be connected to the second connector of the cable.

Example Ex54. The device of Ex53, where the body further includes a protrusion extending from the second end of the body and configured to be disposed between the inlet of the acoustic path and an ear, finger, or other part of a wearer when engaging the body.

Example Ex55. The device of any one of Ex53 to Ex54, further including a substrate disposed at least partially within the connector and extending from the first end of the body, where the microphone is disposed on the substrate.

Example Ex56. The device of Ex55, further including a conductive pad disposed on a portion of the substrate, where the conductive pad is configured to be electrically connected to the microphone and the cable.

Example Ex57. The device of Ex56, where the conductive pad is further configured to electrically connect the microphone and cable to one or more electronic components disposed within a housing of the hearing module.

Example Ex58. The device of any one of Ex55 to Ex57, where a portion of the acoustic path is formed by the substrate.

Example Ex59. The device of Ex58, where the portion of the acoustic path that is formed by the substrate extends through the substrate.

Example Ex60. The device of any one of Ex53 to Ex59, further including a second microphone disposed at least partially within the body.

Figure 2:
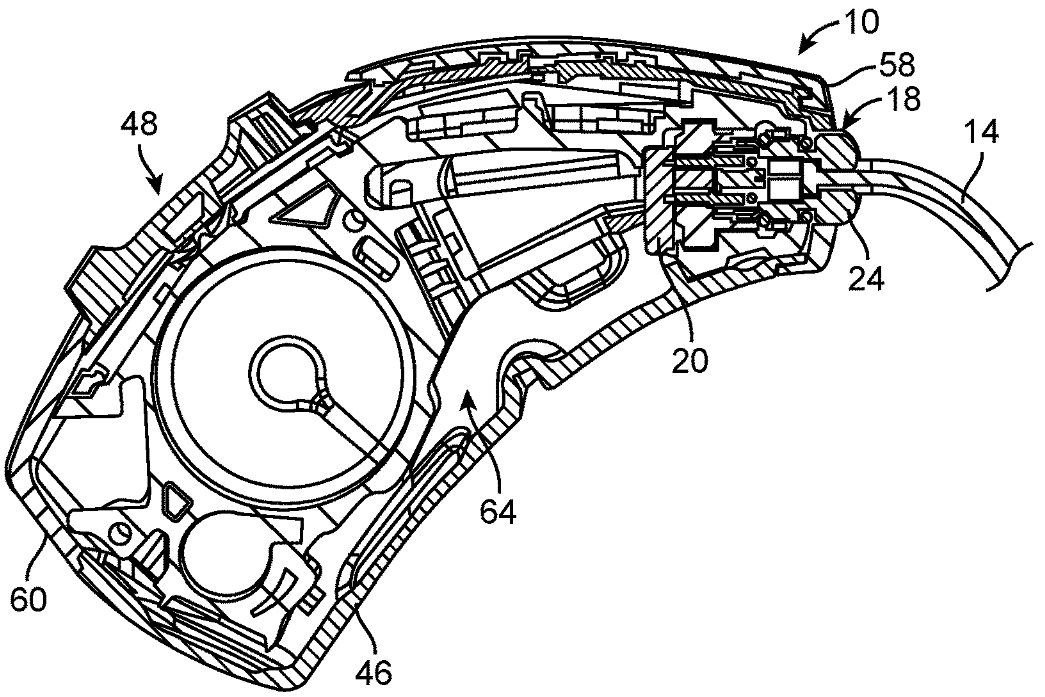
FIG. 2 is a schematic cross-section view of a portion of the hearing device of FIG. 1 with a connector of a cable connected to a housing module of the device.
Figure 4:
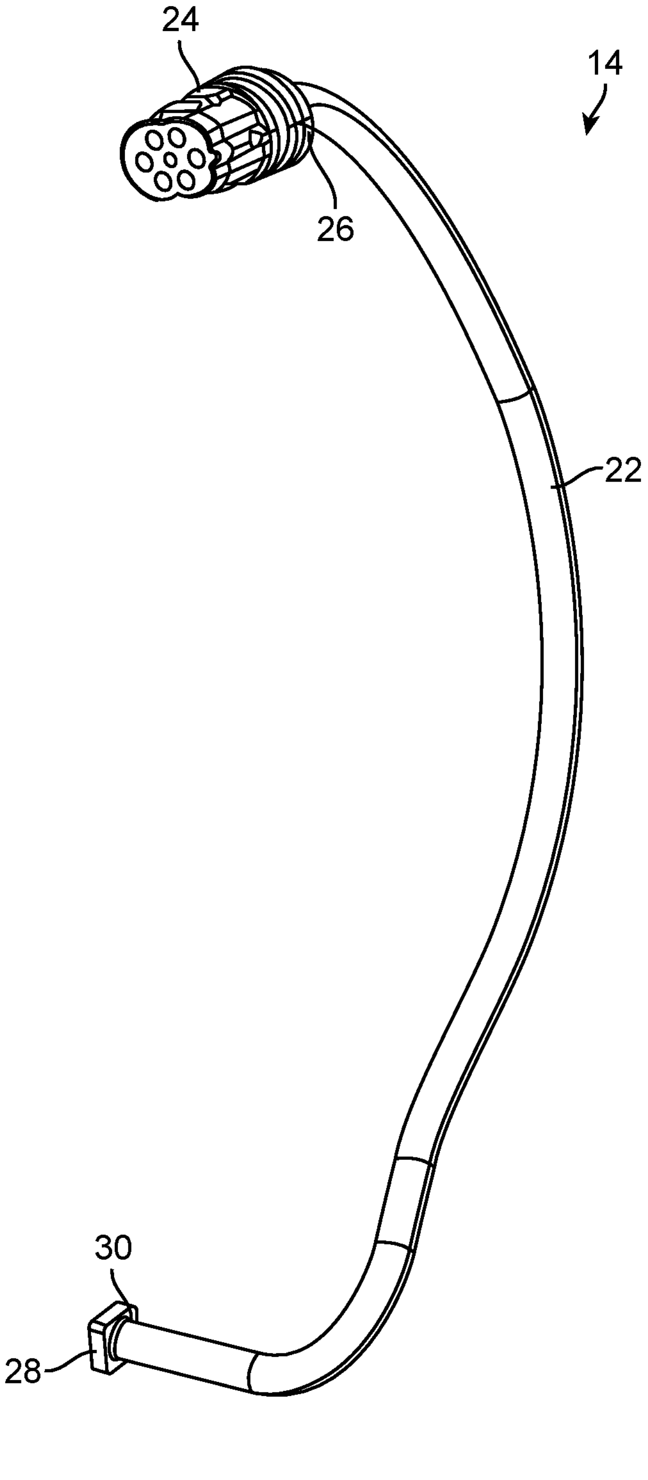
FIG. 4 is a schematic perspective view of a cable of the hearing device of FIG. 1.
Figure 5:
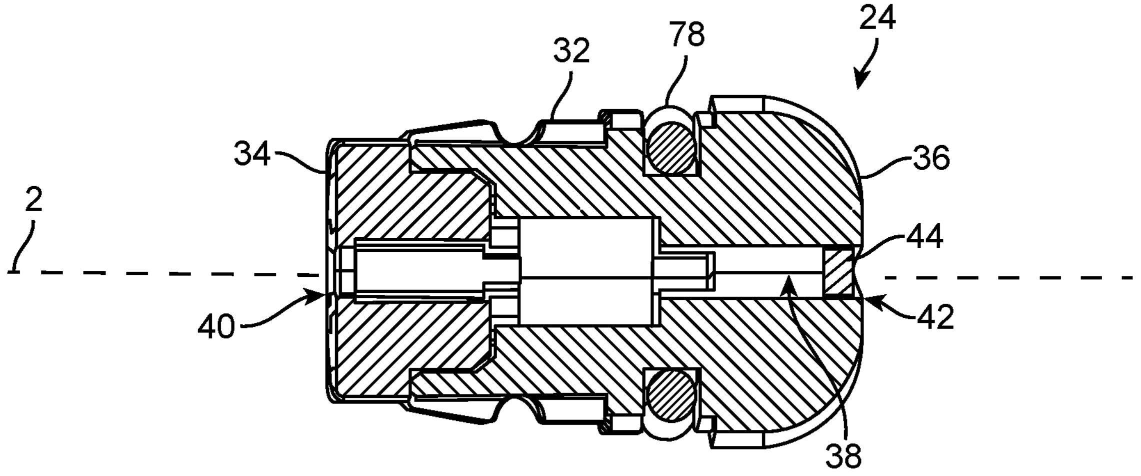
FIG. 5 is a schematic cross-section view of the connector of the hearing device of FIG. 1.
Figure 6:
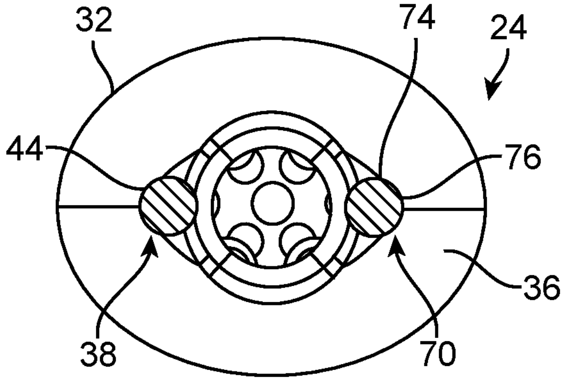
FIG. 6 is a schematic side view of a second end of the connector of FIG. 5.
Figure 7:
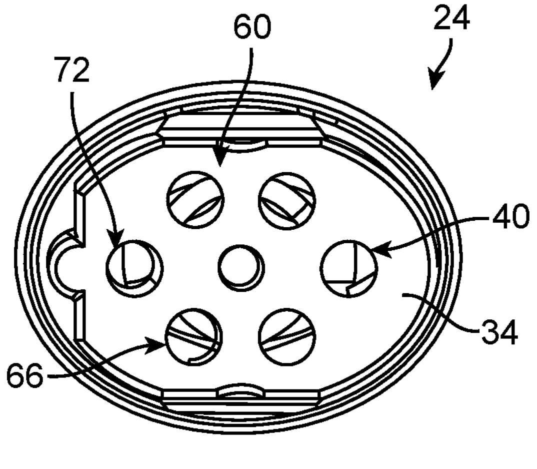
FIG. 7 is a schematic side view of a first end of the connector of FIG. 5.

FIG. 1 is a schematic side view of one embodiment of a hearing device 10. The device 10 includes a hearing module 12, a cable 14, and an earpiece 16. The cable 14 is configured to be connected to the hearing module 12 and the earpiece 16. As shown in FIG. 2, which is a schematic cross-section view of a portion of the hearing device 10, the hearing module 12 includes a cable socket 18 and a microphone 20 acoustically coupled to the cable socket. Further, as shown in FIG. 4, the cable 14 includes a cable body 22 and a first connector 24 disposed at a first end 26 of the cable body, and a second connector 28 disposed at a second end 30 of the cable body. As shown in FIGS. 5-7, the first connector 24 includes a body 32 having a first end 34 and a second end 36, where the first end is configured to be connected to the cable socket 18 of the hearing module 12 and the second end is connected to the first end 26 of the cable body. Although referred to as the first connector 24, the first connector can be the only connector of the cable 14. The first connector 24 further includes an acoustic path 38 disposed through the body 32 of the connector that is configured to be acoustically coupled to the microphone 20 of the hearing module 12 via the cable socket 18 (FIG. 2), where the acoustic path includes an outlet 40 disposed in the first end 34 of the body 32 and an inlet 42 disposed in the second end 36 of the body. The first connector 24 further includes an ingress filter 44 disposed over the inlet 42 of the acoustic path 38 or at least partially within the acoustic path.

The hearing device 10 can include any suitable device that can provide acoustic energy to a wearer using any suitable technique, e.g., by directing sound into the ear of the wearer, bone conduction, implants, etc. In one or more embodiments, the hearing device 10 can include over-the-ear or in-ear headphones, an earpiece, etc. Further, in one or more embodiments, the device 10 can include a hearing assistance device such as behind-the-ear (BTE), in-the-ear (ITE), in-the-canal (ITC), or completely-in-the-canal (CIC) type hearing devices. It is understood that behind-the-ear type hearing devices can reside substantially behind the ear or over the ear. Such devices can include receivers associated with an electronics portion of the behind-the-ear device, or receivers disposed in the ear canal of the user. Such devices are also known as receiver-in-the-canal (RIC) or receiver-in-the-ear (RITE) hearing devices.

The hearing module 12 of the hearing device 10 can be configured to be disposed between the ear and the skull of the wearer. The hearing module 12 includes a module housing 46 and electronic components 48 (FIG. 2) disposed within the module housing. The module housing 46 can take any suitable shape and have any suitable dimensions. The module housing 46 includes a first end 58 and a second end 60. The cable socket 18 is disposed in the first end 58 of the module housing 46. The module housing 46 can further include any suitable material.

The electronic components 48 of the hearing module 12 can include any suitable electronic component or circuitry, e.g., at least one of a controller or processor, an integrated circuit, a power source, a microphone, or a speaker (i.e., receiver). As shown, the electronic components 48 include the microphone 20. The electronic components 48 of the hearing module 12 can be electrically and/or acoustically coupled to the earpiece 16 by the cable 14. Further, in one or more embodiments, the electronic components 48 can be electrically connected to the earpiece 16 by a wireless connection using any suitable wireless technique.

Although depicted as including a single microphone 20, the electronic components 48 of the hearing module 12 can include any suitable number of microphones. Further, the microphone 20 can include any suitable microphone or microphones, e.g., a MEMS microphone, an electret condenser microphone, co-joined microphone sets, etc.

Further, the microphone 20 can be disposed in any suitable portion or portions of the module housing 46. In one or more embodiments, the microphone 20 is disposed such that it is acoustically coupled to the cable socket 18. As used herein, the term "acoustically coupled" means that acoustic energy can propagate from one element or component to another element or component. For example, the microphone 20 is acoustically coupled to the cable socket 18 such that acoustic energy can be directed from the cable socket to the microphone. In one or more embodiments, the microphone 20 is disposed adjacent to the cable socket 18. As used herein, the phrase "adjacent to the cable socket" means that the microphone 20 is disposed closer to the cable socket 18 than to the second end 60 of the module housing 46.

The microphone 20 can include a microphone port 50 (FIG. 3) that is acoustically coupled to the cable socket 18 by a conduit 52 that extends through a wall 54 that forms a portion of the cable socket 18. The wall 54 includes an outer surface 56 that faces the inlet 42 of the first connector 24 when at least a portion of the connector is disposed in the cable socket 18, and an inner surface 62 that faces an interior 64 of the module housing 46 of the hearing module 12. In one or more embodiments, the microphone 20 can be disposed on the inner surface 62 of the wall 54.

As mentioned herein, the hearing module 12 can be connected to the earpiece 16 by the cable 14. The cable 14 includes the cable body 22, the first connector 24 disposed at the first end 26 of the cable body 22, and the second connector 28 disposed at the second end 30 of the cable body. The cable body 22 can take any suitable shape and having any suitable dimensions. Further, the cable body 22 can include any suitable material. In one or more embodiments, the cable body 22 includes one or more conductors that are configured to electrically connect one or more electronic components 48 disposed on or within the module housing 46 to one or more electronic components disposed in the earpiece 16. Further, in one or more embodiments, one or more acoustic paths can be disposed within the cable body 22 that are configured to acoustically couple one or more electronic components 48 of the hearing module 12 to one or more electronic components disposed on or within the earpiece 16. Further, in one or more embodiments, the cable body 22 can include one or more shape memory materials that can be configured to maintain a desired shape of the cable 14.

Additional features can be included with the cable 14. For example, one or more sensors for detecting various physiological characteristics can be disposed on or within the cable body 22 or electrically connected to the cable, e.g., one or more sensors that can detect heart, blood oxygen levels, etc., of the wearer. Further, one or more additional microphones can be disposed in an ear canal of the wearer (e.g., associated with the earpiece 16) and electrically connected to one or more of the electronic components 48 of the hearing module 12 via the cable 14. Additional electrical contacts, buttons, switches, etc., can also be disposed on or at least partially within the cable body 22.

The first connector 24 of the cable 14 can include the body 32 that includes the first end 34 and the second end 36. The body 32 can take any suitable shape and have any suitable dimensions. Further, the body 32 can include any suitable material, e.g., at least one of an inorganic or polymeric material. The first end 26 of the body 32 is configured to be connected to the cable socket 18 of the hearing module 12 using any suitable technique. In one or more embodiments, at least a portion of the first end 34 of the body 32 is disposed within the cable socket 18. The body 32 of the first connector 24 can include one or more tabs, slots, protuberances, or other retention features that can mate with one or more retention features disposed at the first end 58 of the module housing 46 or within the cable socket 18 for maintaining the connection between the first connector and the cable socket. In one or more embodiments, the first connector 24 can be acoustically sealed with the cable socket 18 using any suitable technique. For example, a seal 78 can be disposed on the body 32 of the first connector 24 that acoustically seals the connector to the cable socket 18 such that acoustic energy that is directed through the acoustic path 38 of the first connector is transmitted to the microphone 20. In one or more embodiments, the seal 78 can be disposed at the first end 58 of the module housing 46 or at least partially within the cable socket 18 to acoustically seal the first connector 24 to the socket. Further, in one or more embodiments, the seal 78 can be disposed on the body 32 of the first connector 24, and one or more seals can be disposed at the first end 58 of the module housing 46, within the socket 18, or both on the housing and within the socket to acoustically seal the first connector to the socket.

The first connector 24 can further include one or more openings 66 (FIG. 7) disposed in the first end 34 of the body 32 that are configured to receive one or more pins 68 (FIG. 8) disposed within the cable socket 18 of the hearing module 12. One or more contacts (not shown) can be disposed within each opening 66 of the first connector 24 that are configured to be electrically connected to the pins 68 of the housing module 12 to electrically connect one or more electronic components 48 disposed of the hearing module 12 to one or more electronic components disposed of the earpiece 16 via one or more conductors of the cable 14. In one or more embodiments, the first connector 24 can include one or more pins that extend from the first end 34 of the connector body 32 that are configured to be received by one or more openings disposed within the cable socket 18 to provide one or more electrical connections between the hearing module 12 and the earpiece 16. Although the electrical connections between the first connector 24 and the electronic components 48 utilize pins, any suitable conductive element or elements can be utilized, e.g., scratch contacts, spring-style contacts, etc.

The first connector 24 can be connected to the cable 14 at its second end 36 using any suitable technique. In one or more embodiments, a portion of the cable body 22 can be disposed within the body 32 of the first connector 24 and retained using any suitable technique, e.g., the first connector can be molded, adhered, or mechanically fastened to the cable body.

Disposed through the body 32 of the first connector 24 is the acoustic path 38, which can take any suitable cross-sectional shape and have any suitable dimensions. The acoustic path 38 can extend between the first end 34 and the second end 36 of the cable body 22. In one or more embodiments, the acoustic path 38 can extend along a body axis 2 between the first and second ends 34, 36 of the body 32. In one or more embodiments, at least a portion of the acoustic path 38 extends along a curved path. In one or more embodiments, the acoustic path 38 can take a tortuous shape. The outlet 40 of the acoustic path 38 is disposed in the first end 34 of the body 32, and the inlet 42 of the acoustic path is disposed in the second end 36 of the body.

The acoustic path 38 is acoustically coupled to the microphone 20 via the cable socket 18. In one or more embodiments, the acoustic path 38 is configured to receive acoustic energy from the ambient environment of the hearing module and direct the acoustic energy to the microphone 20 disposed within the hearing module The first connector 24 can include any suitable number of acoustic paths. For example, as shown in FIG. 6, the first connector 24 includes a second acoustic path 70 disposed through the body 32 of the first connector 24. The second acoustic path 70 can take any suitable cross-sectional shape and have any suitable dimensions.

The second acoustic path 70 includes an outlet 72 (FIG. 7) disposed in the first end 34 of the body 32 and an inlet 74 (FIG. 6) disposed in the second end 36 of the body. The second acoustic path 70 can be acoustically coupled to the microphone 20 via the cable socket 18 using any suitable technique. In one or more embodiments, the second acoustic path 70 of the first connector 24 is configured to receive acoustic energy from the ambient environment of the hearing module 12 and direct the acoustic energy to the microphone 20 disposed within the hearing module.

Figure 8:
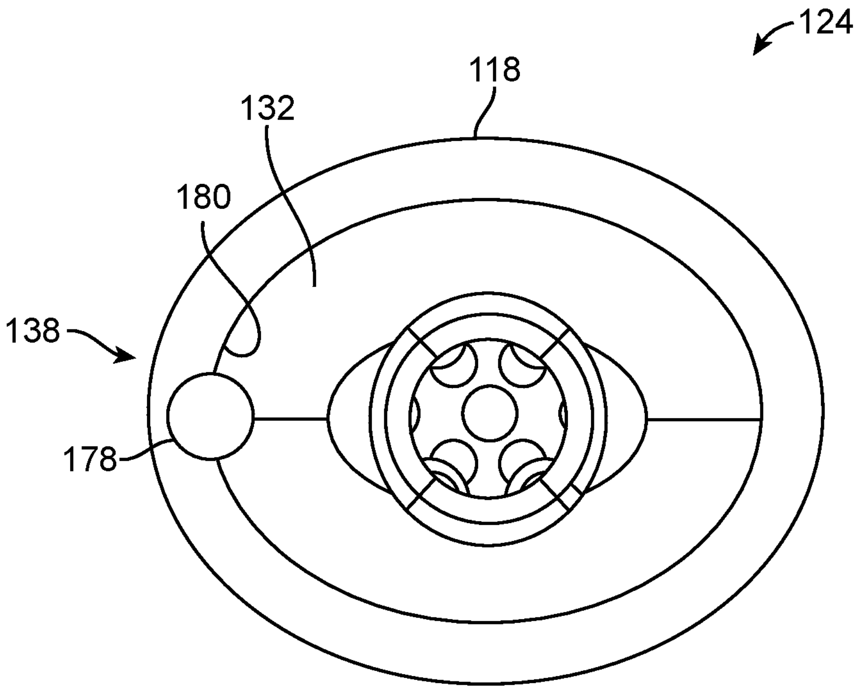
FIG. 8 is a schematic side view of another embodiment of a connector that can be utilized with the hearing device of FIG. 1.

The first and second acoustic paths 38 and 70 can be disposed entirely within the body 32 of the first connector 24. In one or more embodiments, one or more portions of such acoustic paths 38, 70 can be defined in one or more portions of the cable socket 18. For example, FIG. 8 is a schematic plan view of another embodiment of a connector 124 disposed in a cable socket 118 of a hearing module (not shown). All design considerations and possibilities described herein regarding the first connector 24 of FIGS. 1-7 apply equally to the connector 124 of FIG. 8. The connector 124 includes a body 132 and an acoustic path 138 at least partially disposed through the body. A portion 178 of the acoustic path 138 is defined in a sidewall 180 of the cable socket 118 such that the acoustic path is enclosed when the connector 124 is at least partially disposed in the socket. In other words, the acoustic path 138 is formed by the body 132 of the connector 124 and the sidewall 180 of the cable socket 118.

Returning to FIGS. 1-7, the ingress filter 44 is disposed over the inlet 42 of the acoustic path 38. In one or more embodiments, the ingress filter 44 can be disposed at least partially within the acoustic path 38 or completely within the acoustic path. The ingress filter 44 can include any suitable filter that is configured to reduce an amount of foreign material that at least partially occludes the acoustic path 38, thereby reducing at least one of the quality or quantity of acoustic energy that is directed through the acoustic path to the microphone 20. The ingress filter 44 can include any suitable material, e.g., woven or nonwoven materials, acoustic mesh, open-cell foam, etc. In one or more embodiments, the ingress filter 44 is acoustically transparent, i.e., the filter does not appreciably reduce the acoustic energy that is directed into the acoustic path 38 or adversely affect the microphone's response. In one or more embodiments, the ingress filter 44 is configured to affect an acoustical response by no greater than 5 dB.

The connector 24 can also include a second ingress filter 76 disposed over the inlet 74 of the second acoustic path 70 (FIG. 6) or at least partially within the second acoustic path. In one or more embodiments, the second ingress filter 76 is disposed completely within the second acoustic path 70. The second ingress filter 76 can include any suitable ingress filter, e.g., ingress filter 44.

Figure 3:
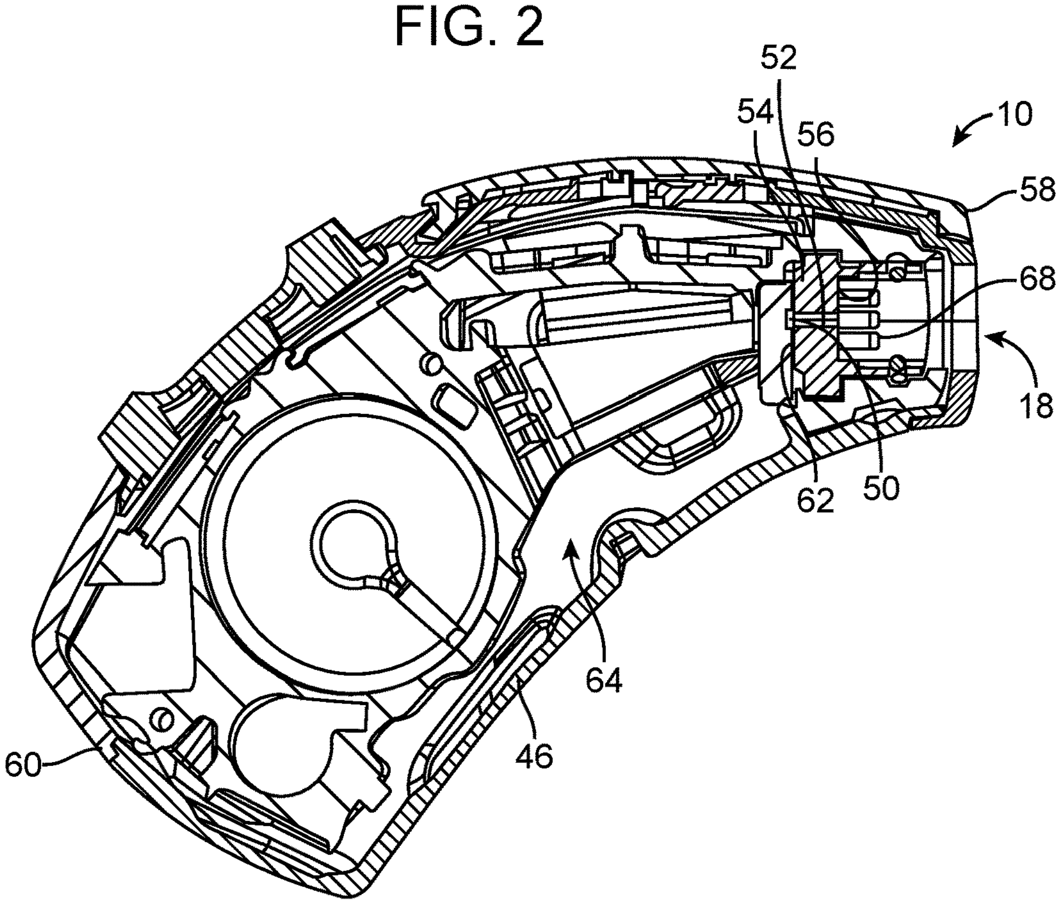
FIG. 3 is a schematic cross-section view of a housing module of the hearing device of FIG. 1.

As shown in FIG. 3, the second connector 28 of the cable 14 can include any suitable connector that is configured to be connected to the earpiece 16. In one or more embodiments, the second connector 28 is permanently connected to the earpiece 16. In one or more embodiments, the second connector 28 is removably connected to the earpiece 16.

Further, the earpiece 16 of the hearing device 10 can include any suitable earpiece. In general, the earpiece 16 can include any suitable electronic components, e.g., at least one of a receiver (i.e., speaker), microphone, processor, or circuitry. Such electronic components can be electrically connected to one or more of the electronic components 48 of the hearing module 12 via the cable 14 or any suitable wireless connection. In one or more embodiments, one or more of the electronic components of the earpiece 16 can be acoustically coupled to one or more of the electronic components 48 of the hearing module 12 via the cable. The earpiece 16 can further include an earbud 17 that is configured to at least partially seal the earpiece to the ear canal of the wearer.

Figure 9:
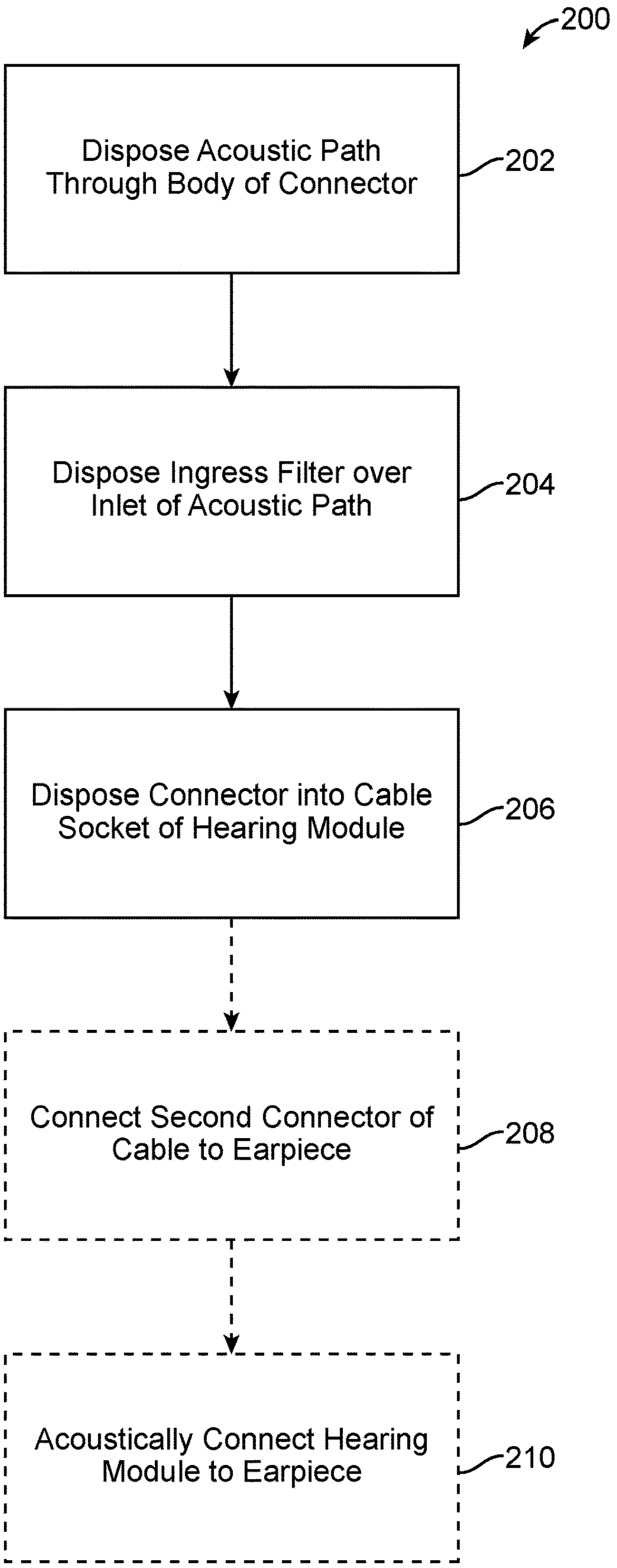
FIG. 9 is a flowchart of one embodiment of a method of assembling the hearing device of FIG. 1.

Any suitable technique can be utilized to form the first connector 24 and connect it to the cable socket 18 such that acoustic energy can be directed through the acoustic path 38 to the microphone 20. For example, FIG. 9 is a flowchart of one embodiment of a method 200. Although described regarding the hearing device 10 of FIGS. 1-7, the method 200 can be utilized with any suitable hearing device. The method 200 includes disposing the acoustic path 38 through the body 32 of the first connector 24 of the cable 14 at 202 using any suitable technique. In one or more embodiments, the acoustic path 38 can be formed in the body 32 when the body is formed by a molding process. In one or more embodiments, the acoustic path 38 can be disposed through the body 32 after the first connector 24 has been formed.

At 204, the ingress filter 44 can be disposed over the inlet 42 of the acoustic path 38 or at least partially within the acoustic path using any suitable technique. The connector 24 can be connected to the cable socket 18 of the hearing module 12 at 206 such that the acoustic path 38 is acoustically coupled to the microphone 20 disposed within the hearing module using any suitable technique. At 208, the second connector 28 of the cable 14 can optionally be connected to the earpiece 16 using any suitable technique. Further, the hearing module 12 can be optionally acoustically coupled to the earpiece 16 at 210 using any suitable technique. The hearing module 12 can be optionally electrically connected to the earpiece 16 using any suitable techniques. In one or more embodiments, the hearing module 12 can be acoustically coupled and electrically connected to the earpiece 16 using any suitable technique.

In the embodiments depicted in FIGS. 1-7, the microphone 20 is disposed within the module housing 46 and receives acoustic energy via the acoustic path 38 of the first connector 24. In one or more embodiments, one or more microphones can be disposed in a connector of a cable such that the one or more microphones can be replaced when the cable is replaced. In general, microphones can be susceptible to damage from sweat, salt, wax, etc., thereby requiring replacement. Microphone replacement in typical hearing devices requires that a hearing module be opened by a skilled technician, and a new microphone soldered to electrical contacts within the module. One or more embodiments of cables described herein can include one or more microphones disposed on or within a cable connector such that the microphones can be replaced by replacing the cable. Such microphone replacement can, therefore, be performed by an audiologist or end user without having to open the module housing and solder the microphone to electrical contacts of the hearing module.

Figure 10:
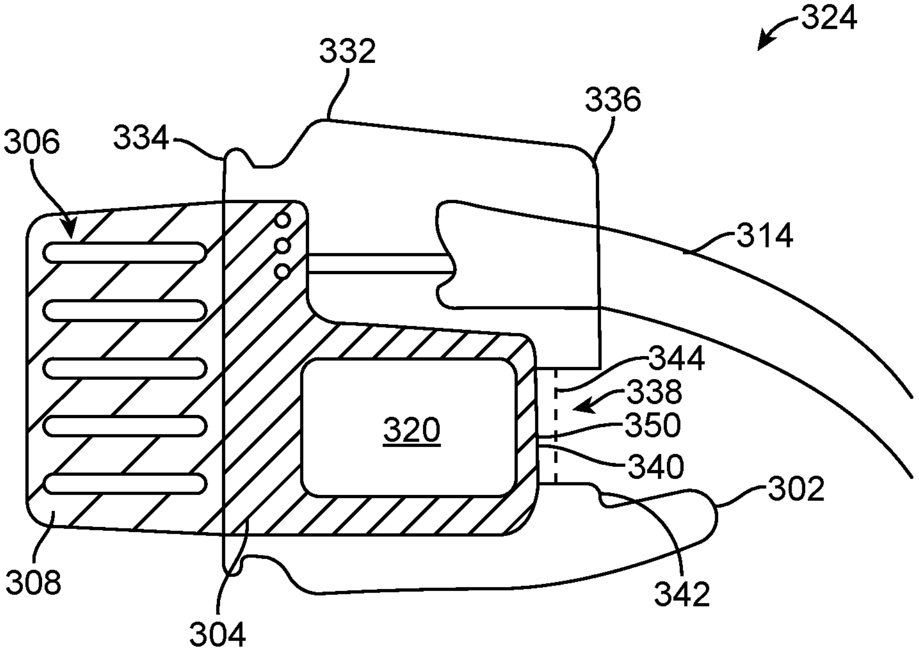
FIG. 10 is a schematic cross-section view of another embodiment of a connector that can be utilized with the hearing device of FIG. 1.

FIG. 10 is a schematic cross-section view of another embodiment of a connector 324. All design considerations and possibilities described herein regarding the first connector 24 of FIGS. 1-7 apply equally to the connector 324 of FIG. 10. Although described regarding the hearing device 10 of FIGS. 1-7, the connector 324 can be utilized with any suitable hearing device. The connector 324 includes a body 332 having a first end 334 and a second end 336. The first end 334 is configured to be connected to a socket of the hearing module, and the second end 336 is configured to be connected to a cable 314. The connector 324 also includes a microphone 320 disposed at least partially within the body 332. The microphone 320 includes a microphone port 350. The connector 324 further includes an acoustic path 338 that includes an outlet 340 and an inlet 342, where the outlet is acoustically coupled to the microphone port 350 and the inlet is disposed in the second end 336 of the body 332. Further, the connector 324 includes an ingress filter 344 disposed over the inlet 342 of the acoustic path 338 or at least partially within the acoustic path as shown in FIG. 10.

The body 332 of the connector 324 can take any suitable shape and have any suitable dimensions. In one or more embodiments, the body 332 can also include a protrusion 302 that extends from the second end 336 of the body. The protrusion 302 is configured to be disposed between the inlet 342 of the acoustic path 338 and the ear, finger, or other part of a wearer when engaging the body. The protrusion 302 can be configured to prevent foreign material from at least partially occluding the acoustic path 338. Further, the protrusion 302 can be configured to prevent a portion or portions of the wearer from partially occluding the inlet 342 of the acoustic path 338. In one or more embodiments, the position of the cable 314 relative to the inlet 342 of the acoustic path 338 can prevent the wearer from inserting one or more fingers into the inlet and potentially depositing foreign material over or at least partially within the acoustic path.

The microphone 320 can be disposed in any suitable location on or within the body 332 of the connector 324. In one or more embodiments, the microphone 320 can be disposed on a substrate 304 that is at least partially disposed within the body 332 of the connector 324. In one or more embodiments, the substrate 304 can be disposed entirely within the body 332. As shown in FIG. 10, the substrate 304 can extend from the first end 334 of the body 332. In one or more embodiments, the microphone 320 can be disposed on the substrate 304. The substrate 304 can be oriented in any suitable position relative to the connector 24 and the wearer. For example, as shown in FIG. 10, the substrate 304 extends along a direction in a vertical plane that would be substantially parallel to a sagittal plane of the wearer.

One or more conductive pads 306 can be disposed on a portion 308 of the substrate 304. Such conductive pads 306 can be configured to be electrically connected to the microphone 320 and the cable 314 using any suitable technique. Further, the conductive pads 306 can be configured to electrically connect the microphone 320 and the cable 314 to one or more electronic components 48 disposed within the housing 46 of the hearing module 12. If the connector 324 is utilized with the hearing device 10 of FIG. 1, then the microphone 20 of the hearing module 12 may be replaced by the microphone 320 of the connector. In one or more embodiments, the hearing module 12 may include one or more microphones 20 in addition to the microphone 320 of the connector 324.

Figure 11:
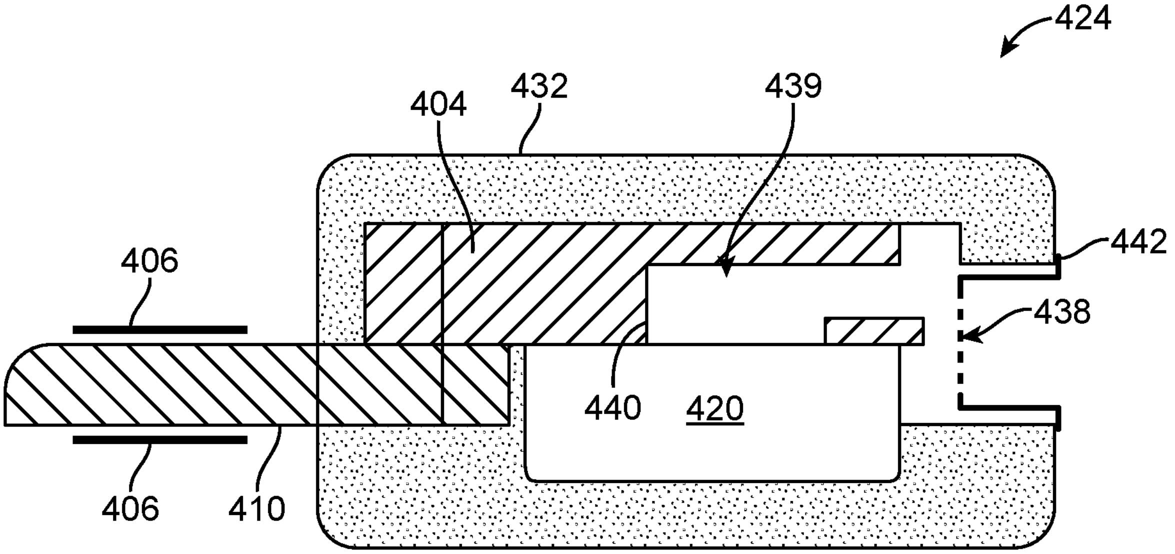
FIG. 11 is a schematic cross-section view of another embodiment of a connector that can be utilized with the hearing device of FIG. 1.

The acoustic path 338 can take any suitable shape and have any suitable dimensions. Further, the acoustic path 338 can be disposed in any suitable portion of the body 332 of the connector 324. Further, one or more portions of the acoustic path 338 can be formed by the substrate 304. For example, FIG. 11 is a schematic cross-section view of another embodiment of a connector 424. All design considerations and possibilities described herein regarding the first connector 24 of FIGS. 1-7 and the connector 324 of FIG. 10 apply equally to the connector 424 of FIG. 11. Although described regarding the hearing device 10 of FIG. 1, the connector 424 can be utilized with any suitable hearing device. The connector 424 includes a microphone 420 disposed on a substrate 404 that is disposed within a body 432 of the connector. An acoustic path 438 extends between an outlet 440 and an inlet 442. A portion 439 of the acoustic path 438 is formed by the substrate 404 using any suitable technique. In one or more embodiments, the portion 439 that is formed by the substrate 404 extends through the substrate.

The substrate 404 can be electrically connected to a second substrate 410 that extends from the body 432 of the connector 424. In one or more embodiments, the second substrate 410 can be offset from the substrate 404 to reduce a thickness of the connector 424. The second substrate 410 can include one or more conductive pads 406 that electrically connect the microphone 420 and the cable 14 (not shown) that is connected to the body 432 of the connector 424 to one or more of the electronic components 48 of the hearing module 12. If the connector 424 is utilized with the hearing device 10 of FIG. 1, then the microphone 20 of the hearing module 12 may be replaced by the microphone 420 of the connector. In one or more embodiments, the hearing module 12 may include one or more microphones 20 in addition to the microphone 420 of the connector 424.

Figure 12:
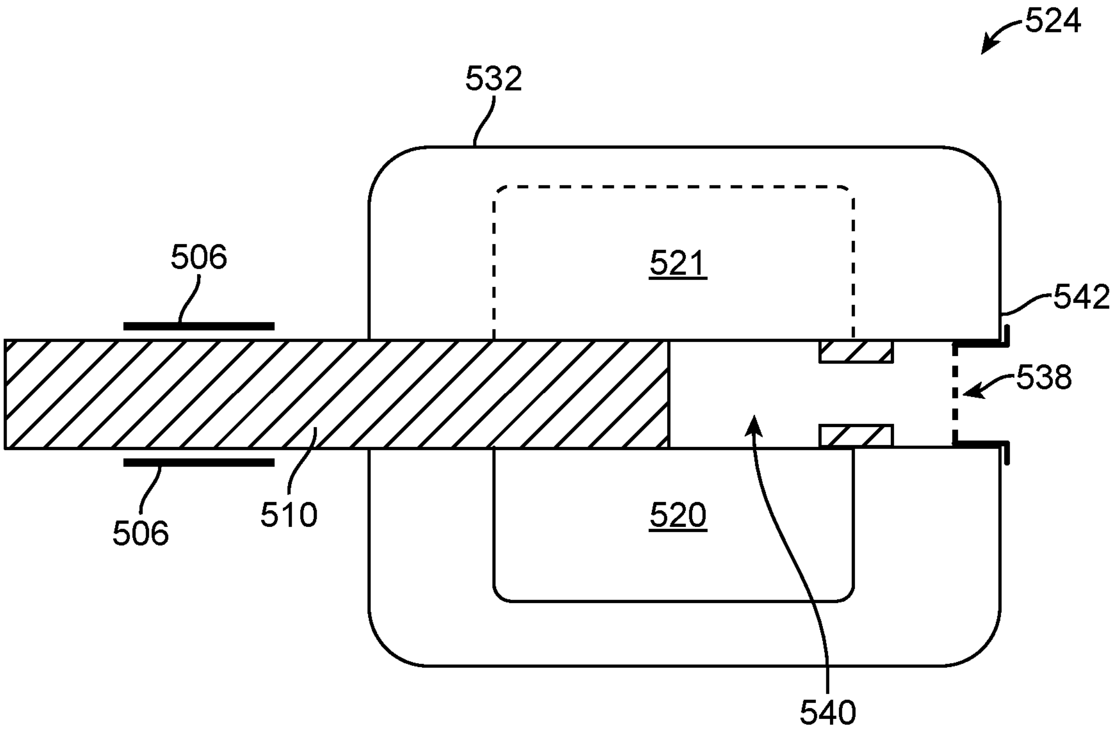
FIG. 12 is a schematic cross-section view of another embodiment of a connector that can be utilized with the hearing device of FIG. 1.

As mentioned herein, any suitable number of microphones can be disposed in a connector of a cable of a hearing device. For example, FIG. 12 is a schematic cross-section view of another embodiment of a connector 524. All design considerations and possibilities described herein regarding connector 24 of FIGS. 1-7, connector 324 of FIG. 10, and connector 424 of FIG. 11 apply equally to connector 524. Although described regarding hearing device 10 of FIG. 1, the connector 524 can be utilized with any suitable hearing device. One difference between connector 524 and connector 424 is that a first microphone 520 and a second microphone 521 are disposed within a body 532 of the connector. The first and second microphones 520, 521 can be disposed in any suitable portions of the body 532. Further, the first and second microphones 520, 521 can be the same type of microphone. In one or more embodiments, the first microphone 520 can be different from the second microphone 521.

Another difference between connector 524 and connector 424 is that a single substrate 510 is utilized to connect the microphones 520, 521 and one or more of the electronic components 48 disposed within the module housing 46 of the hearing module 12 via conductive pads 506. Further, one or both microphones 520, 521 can be disposed on the substrate 510. The substrate 510 can also form one or more portions of an acoustic path 538 that extends between an outlet 540 and an inlet 542. Each of the microphones 520, 521 are acoustically coupled to the acoustic path 538. In one or more embodiments, a second acoustic path (not shown) can be acoustically coupled to the second microphone 521, while the first microphone 520 is acoustically coupled to the acoustic path 538. In one or more embodiments, the second microphone 521 can reduce equivalent input noise (EIN) because summation of the individual signals from each of the two microphones can increase the desired overall signal versus noise. Further, the second microphone 521 can provide redundancy if the first microphone 520 fails or vice versa. If the connector 524 is utilized with the hearing device 10 of FIG. 1, then the microphone 20 of the hearing module 12 may be replaced by the microphones 520, 521 of the connector. In one or more embodiments, the hearing module 12 may include one or more microphones 20 in addition to the microphone 520, 521 of the connector 524.

Figure 13:
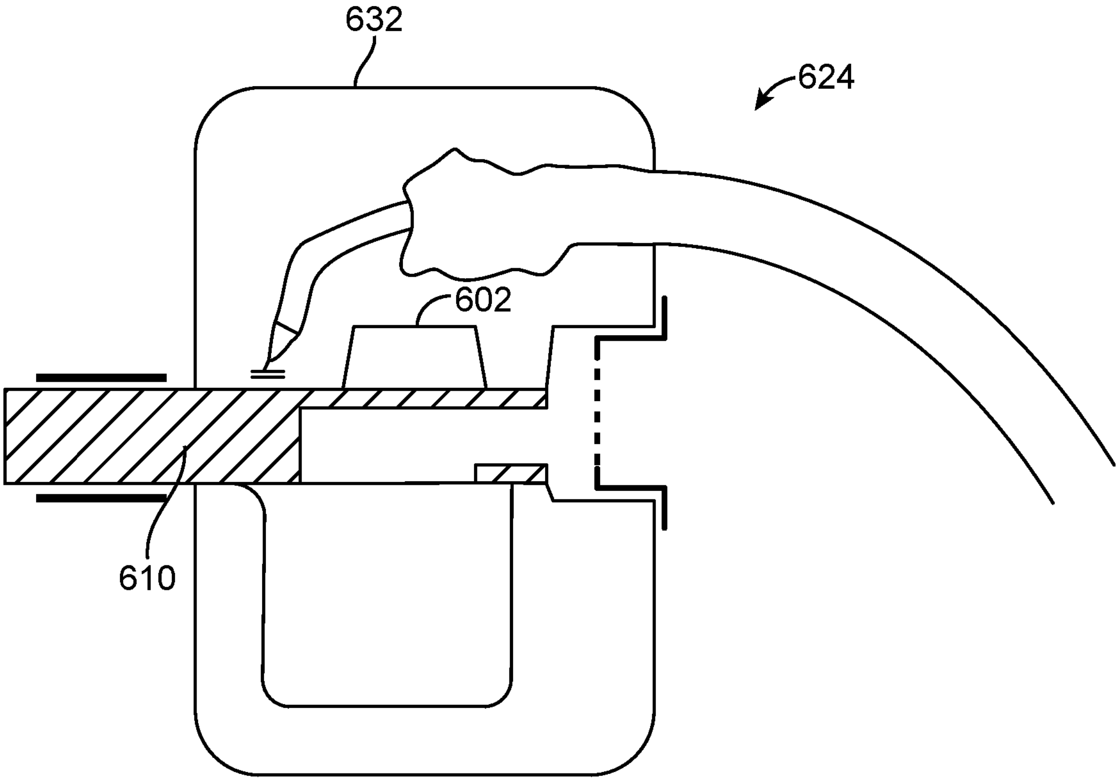
FIG. 13 is a schematic cross-section view of another embodiment of a connector that can be utilized with the hearing device of FIG. 1.

One or more additional features can be implemented with the various embodiments of connectors described herein. For example, FIG. 13 is a schematic cross-section view of another embodiment of a connector 624. All design considerations and possibilities described herein regarding connector 24 of FIGS. 1-7, connector 324 of FIG. 10, connector 424 of FIG. 11, and connector 524 of FIG. 12 apply equally to connector 624 of FIG. 13. One difference between connector 624 and connector 524 is that an LED 602 is disposed on or at least partially within a body 632 of the connector. The LED can be configured to provide one or more signals to a wearer. The LED 602 can be disposed on a substrate 610. Further, the LED 602 can include any suitable light source.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A connector comprising:

a body comprising a first end and a second end, wherein the first end is configured to be connected to a socket of a hearing module and the second end is configured to be connected to a cable;

a microphone disposed at least partially within the body and comprising a microphone port;

a substrate disposed at least partially within the body, the substrate extending from the first end of the body, wherein the microphone is disposed on the substrate;

an acoustic path comprising an inlet and an outlet, wherein the inlet is disposed in the second end of the body and the outlet is acoustically coupled to the microphone port; and an ingress filter disposed over the inlet of the acoustic path or at least partially within the acoustic path.

2. The connector of claim 1, wherein the body further comprises a protrusion extending from the second end of the body and configured to be disposed between the inlet of the acoustic path and an ear, finger, or other part of a wearer when engaging the body.

3. The connector of claim 1, further comprising a conductive pad disposed on a portion of the substrate, wherein the conductive pad is configured to be electrically connected to the microphone and the cable.

4. The connector of claim 3, wherein the conductive pad is further configured to electrically connect the microphone and cable to one or more electronic components disposed within a housing of the hearing module.

5. The connector of claim 1, wherein a portion of the acoustic path is formed by the substrate.

6. The connector of claim 1, further comprising a second microphone disposed at least partially within the body.

7. The connector of claim 1, wherein the ingress filter of the connector is disposed over the inlet of the acoustic path.

8. The connector of claim 1, where the ingress filter of the connector is disposed within the acoustic path.

9. A hearing device cable comprising:

a cable body; and a first connector comprising:

a body comprising a first end and a second end, wherein the first end is configured to be connected to a socket of a hearing module and the second end is configured to be connected to the cable body;

a microphone disposed at least partially within the body and comprising a microphone port;

a substrate disposed at least partially within the body, the substrate extending from the first end of the body, wherein the microphone is disposed on the substrate;

an acoustic path comprising an inlet and an outlet, wherein the inlet is disposed in the second end of the body and the outlet is acoustically coupled to the microphone port; and an ingress filter disposed over the inlet of the acoustic path or at least partially within the acoustic path.

10. The hearing device cable of claim 9, further comprising a second connector disposed at a second end of the cable body, where the second connector is configured to be connected to an earpiece of a hearing device.

11. The hearing device cable of claim 9, wherein the body further comprises a protrusion extending from the second end of the body and configured to be disposed between the inlet of the acoustic path and an ear, finger, or other part of a wearer when engaging the body.

12. The hearing device cable of claim 9, further comprising a conductive pad disposed on a portion of the substrate, wherein the conductive pad is configured to be electrically connected to the microphone and the cable body.

13. The hearing device cable of claim 12, wherein the conductive pad is further configured to electrically connect the microphone and cable to one or more electronic components disposed within a housing of the hearing module.

14. The hearing device cable of claim 9, wherein a portion of the acoustic path is formed by the substrate.

15. The hearing device cable of claim 9, wherein the acoustic path extends along a body axis between the first and second ends of the body.

16. The hearing device cable of claim 9, wherein the ingress filter of the first connector is disposed over the inlet of the acoustic path.

17. The hearing device cable of claim 9, where the ingress filter of the first connector is disposed within the acoustic path.

18. A hearing device comprising:

a hearing module having a cable socket; and a cable having a cable body, a first connector disposed at a first cable end of the cable body, and a second connector disposed at a second cable end of the cable body, wherein the first connector includes:

a connector body comprising a first connector end and a second connector end, wherein the first connector end is configured to be connected to the cable socket of the hearing module and the second connector end is configured to be connected to the cable body;

a microphone disposed at least partially within the connector body and comprising a microphone port;

a substrate disposed at least partially within the connector body, the substrate extending from the first connector end of the connector body, wherein the microphone is disposed on the substrate;

an acoustic path comprising an inlet and an outlet, wherein the inlet is disposed in the second connector end of the connector body and the outlet is acoustically coupled to the microphone port; and an ingress filter disposed over the inlet of the acoustic path or at least partially within the acoustic path.

19. The hearing device of claim 18, further comprising a conductive pad disposed on a portion of the substrate, wherein the conductive pad is configured to be electrically connected to the microphone and the cable.

20. The hearing device of claim 18, wherein a portion of the acoustic path is formed by the substrate.

* * * * *